No. 650,383. Patented May 29, 1900.
S. S. EVELAND.
ROLLER BEARING.
(Application filed Sept. 22, 1899.)
(No Model.)
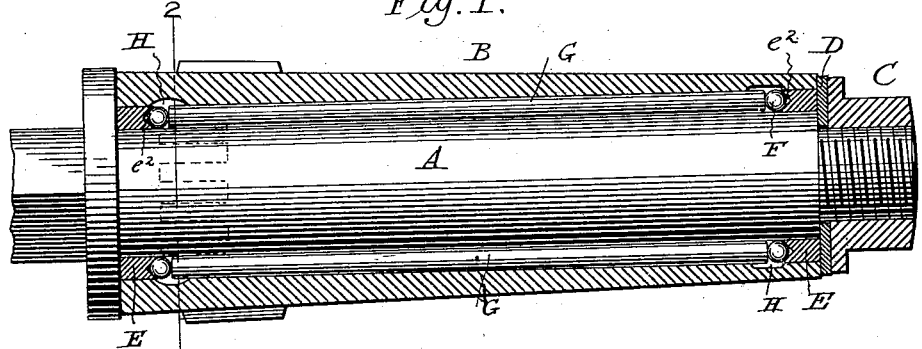
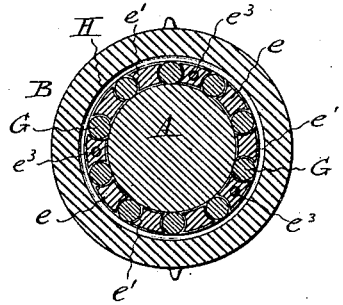
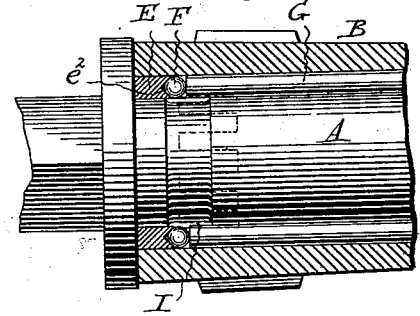
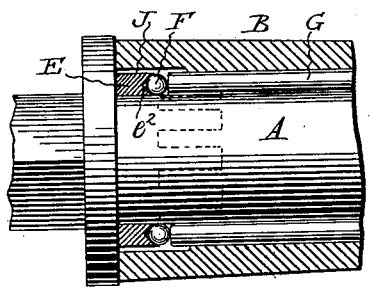
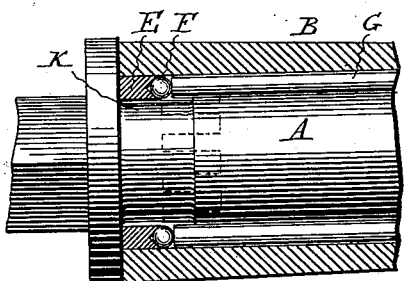
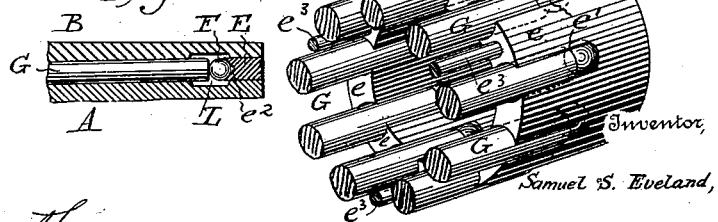
Witnesses,
Sidney P. Hollingsworth
Inventor,
Samuel S. Eveland,
by Baldwin Davidson & Wright
Attorneys
THE NORRIS PETERS CO., PHOTO-LITHO., WASHINGTON, D. C.

UNITED STATES PATENT OFFICE.

SAMUEL S. EVELAND, OF PHILADELPHIA, PENNSYLVANIA.

ROLLER-BEARING.

SPECIFICATION forming part of Letters Patent No. 650,383, dated May 29, 1900.

Application filed September 22, 1899. Serial No. 731,290. (No model.)

*To all whom it may concern:*

Be it known that I, SAMUEL S. EVELAND, a citizen of the United States, residing at No. 4139 Westminster avenue, in the city of Philadelphia, county of Philadelphia, and State of Pennsylvania, have invented certain new and useful Improvements in Roller-Bearings, of which the following is a specification.

My invention relates to that class of roller-bearings in which rollers are interposed between a shaft and a hub or casing surrounding the shaft. As an example of this class of roller-bearings I would refer to Letters Patent No. 602,047, dated April 5, 1898, granted to Charles B. Hobron. This patent shows a roller-bearing in which rollers of uniform diameter from end to end are interposed between a shaft or axle-arm and a hub or casing. The rollers are disposed equal distances apart around the shaft, and they are held in place at opposite ends by roller-supports consisting of rings provided with laterally-projecting lugs having sockets between them, into which the ends of the rollers project. The Hobron roller-bearing has been extensively used with success; but in the practice of the invention I have discovered that the ends of the rollers sometimes cut either into the axle or into the casing surrounding the axle. This may be caused by a lack of proper lubrication at the ends of the rollers, or it may be caused by the fact that the weight is suddenly stopped at the ends of the rollers. At any rate, the cutting occurs, and especially when an axle is not properly "set." I have discovered that by relieving the ends of the rollers from frictional contact with the casing or with the shaft the objection above referred to may be obviated and better lubrication may be obtained.

In carrying out my invention I provide a recess or recesses, either in the casing or in the axle or shaft, so formed as to relieve the ends of the rollers from contact on one side, or I may form recesses both in the shaft or axle-arm and in the casing, and thus relieve the ends of the rollers on both sides from frictional contact. Either method accomplishes the result, preventing cutting of the shaft or casing at the ends of the rollers, and in all probability the construction permits of the rollers springing back slightly if any undue pressure is exerted against them. Where the rollers are firmly held at their ends, any undue strain at the ends of the rollers will cause them to bite into the surfaces with which they are in contact; but by cutting away the surfaces at these points this wear is prevented.

In the accompanying drawings I have shown the best ways now known to me of carrying out my invention.

Figure 1 shows the end of a vehicle-axle surrounded by a casing with my improved roller-bearing applied. The axle-arm and the rollers are shown in side elevation, while most of the other parts are shown in longitudinal section. Fig. 2 shows a transverse section on the line 2 2 of Fig. 1. Fig. 3 is a view, partly in side elevation and partly in longitudinal section, of a part of a vehicle-axle provided with a modified form of my invention. Fig. 4 is a similar view showing another modification. Fig. 5 is a similar view showing a third modification. Fig. 6 is a detail view of a fourth modification, and Fig. 7 is a detail perspective view showing the manner of supporting the ends of the rollers in the roller-supports.

While I have shown in the drawings my invention applied to a vehicle-axle, I wish it understood that it is not confined to vehicle-axles; but it may be applied wherever rollers are used in a bearing.

In Fig. 1, A indicates an axle-arm which is surrounded by a casing B, which may be applied to a vehicle-hub. C indicates the nut usually employed to hold the hub on the axle-arm, and D indicates a washer interposed between the nut and the hub. E indicates two roller-supports similar to those shown in Hobron's patent above mentioned. Each of these supports consists of a ring provided with laterally-projecting lugs $e$, having sockets $e'$ between them, in which the ends of the rollers are arranged. Balls F are interposed between the extreme ends of the rollers and the ends of the sockets, the balls being in the axial line of the rollers, and preferably the ends of the sockets are recessed at $e^2$. The roller-supports are held together and held suitable distances apart by rods $e^3$. The rollers G are of uniform diameter from end to end. In the Hobron patent the rollers are shown as bearing against the shaft and casing practically from end to end. In this construction undue wear occurs on the casing or on the axle, as above specified. To prevent this, I may form an annular recess H in the casing around the ends of the rollers at one end of the bearing, or I may form similar recesses at both ends of the rollers, as indicated in Fig. 1. In this construction the rollers bear against the shaft or axle-arm throughout their entire length. They bear against the casing throughout the greater portion of their length, but are out of contact with the casing for a short distance at each end. I have found that with such a construction the wear or cutting which heretofore occurred on the axle-arm or shaft and on the casing is prevented. The recesses provide for better lubrication, for the accumulation of dust and grit, and also appear to relieve the weight or strain on the ends of the rollers, especially when the bearing is not properly set or when there is undue strain at one end.

Instead of forming the recess in the casing I may form it in the shaft, as indicated at I in Fig. 3. In Figs. 1 and 3 the recesses are shown as extending for a short distance across the ends of the rollers and terminating approximately on a line with the inner ends of the roller-sockets. The recesses may, however, be extended outward to the ends of the casing and to the outer ends of the roller-supports, as indicated at J in Fig. 4 and at K in Fig. 5.

In Figs. 1 to 5, inclusive, there is only one recess at each end of the rollers—that is to say, the recess is formed either in the casing or in the shaft, but not in both; but I may form recesses in both the shaft and casing, as indicated at L in Fig. 6. A continuous recess or continuous recesses may be employed or there may be separate recesses.

My invention is especially intended for use in connection with rollers which have no shoulders or journals at their ends, but which are of uniform diameter from end to end. Other methods of supporting the rollers or of holding them in place may be employed, the essential feature of my invention being the provision of means for relieving the ends of the rollers from contact with the shaft or casing, where, as has been found, they tend to produce more wear than at other points.

I claim as my invention—

1. The combination of rollers and a shaft and casing, one of which is provided with a recess at the ends of the rollers to relieve their peripheries near their ends from contact with friction-surface.

2. The combination of rollers and a shaft and casing, each of which is formed with a recess at the ends of the rollers to relieve the peripheries of the rollers near their ends from contact with friction-surfaces.

3. The combination of rollers and a shaft and casing, one of which is provided with a recess which extends past the ends of the rollers to relieve the peripheries of the rollers near their ends from contact with friction-surface.

4. The combination of rollers of uniform diameter from end to end, a shaft and casing, one of which is provided with a recess at the ends of the rollers to relieve their peripheries near their ends from frictional contact, and provide a chamber for a lubricant.

5. The combination of rollers and a shaft and casing, which casing is provided with a recess at the ends of the rollers to relieve the rollers from contact with friction-surface on one side.

In testimony whereof I have hereunto subscribed my name.

SAMUEL S. EVELAND.

Witnesses:
CHARLES E. LEX,
J. CAMPBELL LANCASTER.